United States Patent
Huebner et al.

(10) Patent No.: US 8,083,949 B2
(45) Date of Patent: Dec. 27, 2011

(54) SYSTEM AND METHOD FOR SELECTIVELY REMOVING IONS FROM ACIDIC SOLUTIONS

(75) Inventors: David A. Huebner, McKenna, WA (US); David L. Crump, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 12/372,361

(22) Filed: Feb. 17, 2009

(65) Prior Publication Data

US 2010/0206814 A1 Aug. 19, 2010

(51) Int. Cl.
*C02F 1/42* (2006.01)
(52) U.S. Cl. ........ 210/681; 210/660; 210/662; 210/634; 210/638
(58) Field of Classification Search .................. None
See application file for complete search history.

(56) References Cited

U.S. PATENT DOCUMENTS 5,720,823 A * 2/1998 Carlson et al. ................. 134/3

OTHER PUBLICATIONS

DeSilva et al. "Some Like it Hot, Some Like it Cold". 2000. Water Quality Products Magazine.*
Fernandez et al. "Kinetics of Metal ion Exchange in Iminodiaceetic Resins at Low Concentrations". 1993. J. Chem. Tech. Biotechnol. vol. 58, pp. 255-260.*
Diniz et al. "The use of the chelating resin Dowex M-4195 in the adsorption of selected heavy metal ions from manganese solutions". 2005. Hydrometallurgy. vol. 78. pp. 147-155.*
Henkel Surface Technologies, "Technical Process Bulletin," No. 238904, regarding TURCO® ALDOX V (Sep. 15, 2006).
The Dow Chemical Company, "Dow Water Solutions—DOWEX™ M4195," http://www.dow.com/liquidseps/prod/dx_m4195.htm.
The Dow Chemical Company, "Dow Water Solutions—New Products, Chelating, and Selective Resins," http://www.dow.com/liquidseps/prod/sp_chel.htm.
The Dow Chemical Company, "Dow Water Solutions—DOWEX Resins for Separation of Copper from Liquid Media," http://www.dow.com.liquidseps/prod/pt_cu.htm.
Printing Wiring Board Resource Center (PWBRC), "Ion Exchange," http://www/pwbrc.org/bmr/ix.htm.
Remco Engineering, "Ion Exchange," http://www.remco.com/ix.htm.

* cited by examiner

*Primary Examiner* — Yelena G Gakh
*Assistant Examiner* — David Weisz
(74) *Attorney, Agent, or Firm* — Kathryn Soucy

(57) ABSTRACT

A system for selectively removing at least one undesirable ion from an acidic solution including a tank receiving the acidic solution, a chiller in fluid communication with the tank, the chiller being configured to reduce a temperature of the acidic solution, and an ion exchanger in fluid communication with the chiller, the ion exchanger including an ion exchange resin that is selective for the undesirable ion.

8 Claims, 3 Drawing Sheets

SYSTEM AND METHOD FOR SELECTIVELY REMOVING IONS FROM ACIDIC SOLUTIONS

FIELD

The present patent application relates to the selective removal of ions from acidic solutions and, more particularly, to the selective removal of specific, undesirable metal ions, such as copper, from strongly acidic deoxidizer solutions.

BACKGROUND

Deoxidizer solutions are used to treat the surfaces of various metals and metal alloys by deoxidizing, desmutting and/or etching the surface of the treated metal or metal alloy. Deoxidizer solutions are particularly useful for treating metals and metal alloys prior to anodizing, conversion coating, bonding and welding. For example, aluminum and aluminum alloys are commonly treated with a deoxidizer solution prior to anodizing to lower the surface resistance of the material.

Deoxidizer solutions typically include strong acids that are optionally fortified with various beneficial metal ions. For example, prior to anodizing, an aluminum substrate is commonly treated with a deoxidizer solution that includes a strong nitric acid solution fortified with iron ions. A commercially available example of such a deoxidizer solution for treating aluminum substrates is prepared by blending water and 42° Baume nitric acid with a quantity of TURCO® ALDOX V solution, which is available from Henkel Surface Technologies of Madison Heights, Mich. The TURCO® ALDOX V solution introduces iron ions to the deoxidizer solution.

After repeated use, a deoxidizer solution may become contaminated with undesirable metal ions that may diminish the treatment effect of the deoxidizer solution. For example, the water, nitric acid and TURCO® ALDOX V solution mixture discussed above may become contaminated with copper ions after being repeatedly used to treat aluminum alloys. Copper ion concentrations in excess of about 200-300 parts per million, certainly concentrations in excess of 600 parts per million, substantially inhibit the treatment effect of such deoxidizer solutions. Therefore, once a threshold contamination level has been reached, the contaminated deoxidizer solution must be discarded and a fresh deoxidizer solution must be prepared, thereby presenting the user with hazardous waste disposal costs in addition to the cost associated with preparing fresh deoxidizer solution.

Accordingly, those skilled in the art continue to look for techniques for selectively removing certain undesirable ions, such as copper ions, from acidic solutions.

SUMMARY

In one aspect, the disclosed system for selectively removing ions from an acidic solution may include a tank receiving the acidic solution, a chiller in fluid communication with the tank, the chiller being configured to reduce a temperature of the acidic solution, and an ion exchanger in fluid communication with the chiller, the ion exchanger including an ion exchange resin that is selective for the ion to be removed.

In another aspect, the disclosed method for selectively removing undesirable ions from an acidic solution may include the steps of cooling the acidic solution such that a temperature of the acidic solution is at most about 50° F. and, after the cooling step, contacting the acidic solution with an ion exchange resin, the ion exchange resin being selective for the undesirable ion.

In another aspect, the disclosed method for selectively removing undesirable ions from an acidic solution may include the steps of measuring a concentration of the undesirable ion in the acidic solution, the acidic solution being stored in a tank, drawing the acidic solution from the tank when the concentration exceeds a predetermined threshold value, cooling the drawn acidic solution such that a temperature of the drawn acidic solution is at most about 50° F., and contacting the cooled acidic solution with an ion exchange resin, the ion exchange resin being selective for the undesirable ion.

Other aspects of the disclosed system and method for selectively removing ions from acidic solutions will become apparent from the following description, the accompanying drawings and the appended claims.

DETAILED DESCRIPTION

Figure 1:
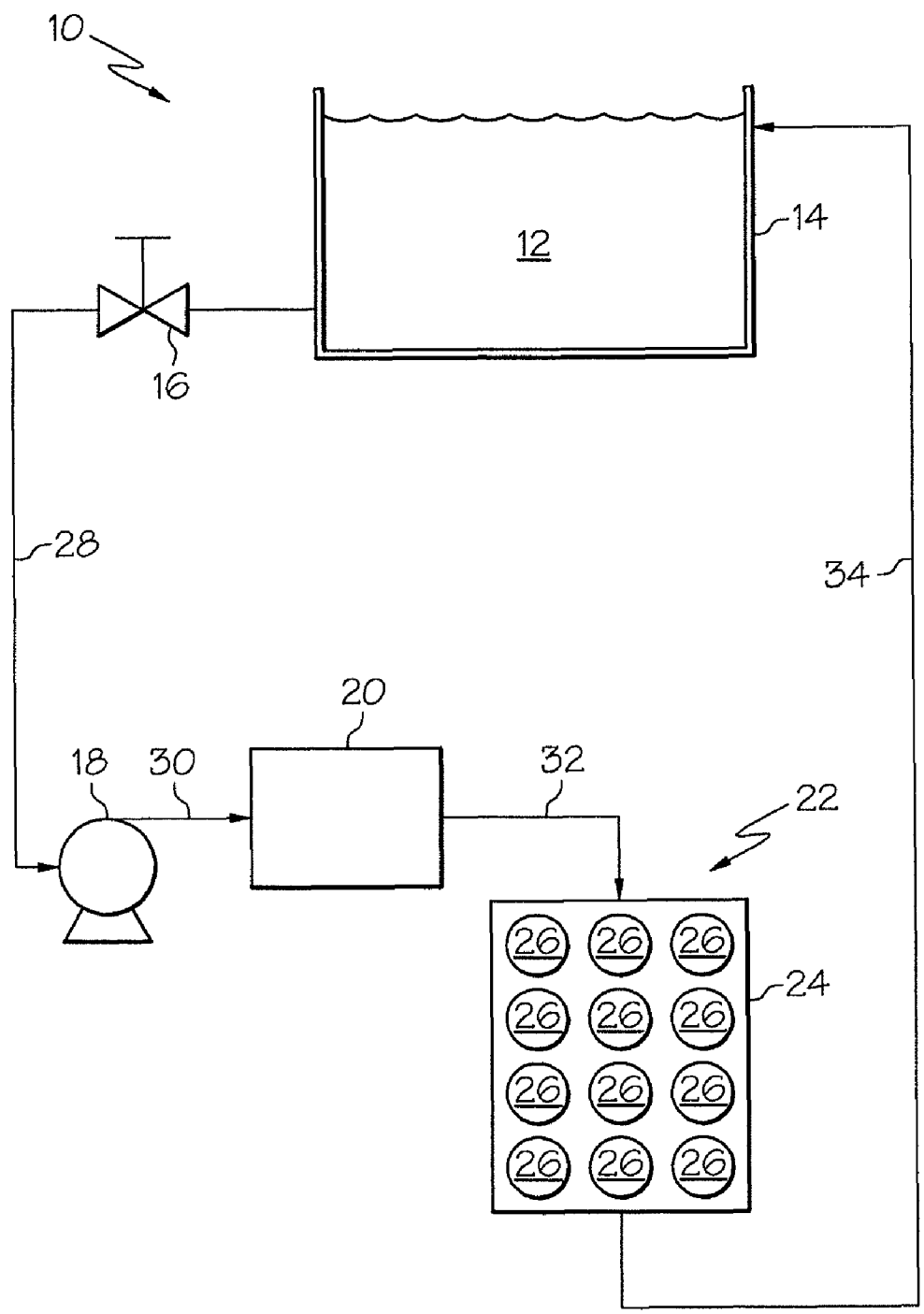
FIG. 1 is a process flow diagram illustrating one aspect of the disclosed system for selectively removing ions from acidic solutions.

In one aspect, the disclosed system for selectively removing ions from acidic solutions may be a continuous treatment system, wherein the acidic solution is continuously being treated to selectively remove contaminating ions. As shown in FIG. 1, the continuous treatment system, generally designated 10, may include an acidic solution 12, a tank 14, a valve 16, a pump 18, a chiller 20 and an ion exchanger 22.

The acidic solution 12 may be any acidic solution that may become contaminated with undesirable ions. In one aspect, the acidic solution 12 may be a deoxidizer solution, such as a deoxidizer used for treating aluminum and aluminum alloys. A general example of a deoxidizer solution useful as the acidic solution 12 may be a solution of water, nitric acid and TURCO® ALDOX V solution (a commercially available concentrate that includes ferric sulfate, among other things). As a specific example, the deoxidizer solution may include water, about 27 percent by weight nitric acid, about 0.3 percent by weight hydrofluoric acid, and about 15 grams per liter ferric sulfate.

The tank 14 may be any vessel capable of receiving and holding the acidic solution 12, and may be formed from an acid-resistant material (e.g., stainless steel). While those skilled in the art will appreciate that the size of the tank 14 may vary based upon design considerations, an exemplary tank 14 may be a 500 gallon stainless steel tank.

In one particular aspect, the tank 14 may be a treatment tank into which work pieces (e.g., aluminum alloy parts) (not shown) may be submerged for treatment by the acidic solution 12 received therein. In another particular aspect, the tank 14 may be a holding tank for supplying the acidic solution 12 to a spraying operation and for receiving return acidic solution 12 after spraying a work piece.

The pump 18 may be any appropriate pumping device capable of drawing the acidic solution 12 from the tank 14 by way of flow line 28 and passing the acidic solution 12 to the chiller 20 by way of flow line 30, then to the ion exchanger 22 by way of flow line 32 and, ultimately, back to the tank 14 by way of flow line 34. For example, the pump 18 may be a displacement pump.

The valve 16 may be disposed on flow line 28 to control the flow rate of the acidic solution 12 passing therethrough. While those skilled in the art will appreciate that the flow rate of the acidic solution 12 will most likely depend on the overall size of the system 10, an exemplary flow rate may be about 10 gallons per minute when the tank 14 holds about 400 to 500 gallons of acidic solution 12.

The chiller 20 may be any device or system capable of extracting thermal energy from the acidic solution 12 in flow line 30, such that the temperature of the acidic solution 12 in flow line 32 is less than the temperature of the acidic solution 12 in flow line 32. For example, the chiller 20 may be a heat exchanger having a refrigerated fluid (e.g., ethylene glycol) flowing therethrough. However, those skilled in the art will appreciate that the chiller 20 may employ myriad techniques or processes for lowering the temperature of the acidic solution 12 as it passes therethrough.

In one aspect, the chiller 20 may reduce the temperature of the acidic solution 12 to about 50° F. or below. In another aspect, the chiller 20 may reduce the temperature of the acidic solution 12 to about 45° F. or below. In another aspect, the chiller 20 may reduce the temperature of the acidic solution 12 to about 40° F. or below. In one particular aspect, the chiller 20 may reduce the temperature of the acidic solution 12 to about 42° F.

The ion exchanger 22 may include a resin chamber 24 and a selective ion exchange resin 26 received in the ion exchange chamber 24. The selective ion exchange resin 26 may selectively remove certain undesirable ions, such as copper ions, from the acidic solution 12, without significantly removing certain desirable ions, such as iron ions, from the acidic solution 12. The selective ion exchange resin 26 may be a resin capable of scavenging metal ions from acidic solutions having a pH below 2 without sustaining substantial damage.

In one aspect, the selective ion exchange resin 26 may be a copper selective ion exchange resin. For example, the selective ion exchange resin 26 may be DOWEX™ M4195 chelating resin, available from The Dow Chemical Company of Midland, Mich., which includes bis-picolyamine functionality on a styrene-DVB, monoporous matrix. In one particular aspect, the copper selective ion exchange resin may be selected to remove copper ions at a greater proportion than iron ions.

Without being limited to any particular theory, it is believed that cooling the temperature of the acidic solution 12 prior to passing the acidic solution 12 through the ion exchanger 22 improves the selective removal of ions from the deoxidizer solution 12, with cooler temperatures exhibiting greater selective removal of undesirable ions vis-à-vis desirable ions. For example, when a copper selective ion exchange resin is used, cooler temperatures (e.g., temperatures at or below about 50° F.) may remove copper ions at a greater proportion than iron ions.

Accordingly, the system 10 may continuously draw acidic solution 12 from the tank 14 and may cool the acidic solution 12 prior to passing the acidic solution 12 through the ion exchanger 22 to selectively remove undesirable ions. Then, the system 10 may return the treated acidic solution 12 to the tank 14 without interrupting the availability of the acidic solution 12 in the tank 14.

In an alternative aspect, the disclosed system for selectively removing ions from acidic solutions may be a periodic treatment system, wherein the acidic solution is only periodically treated to selectively remove contaminating ions. The periodic treatments may be performed at regular intervals or, as will be discussed below, when the concentration of a certain ions in the acidic solution exceeds a predetermined threshold value.

Figure 2:
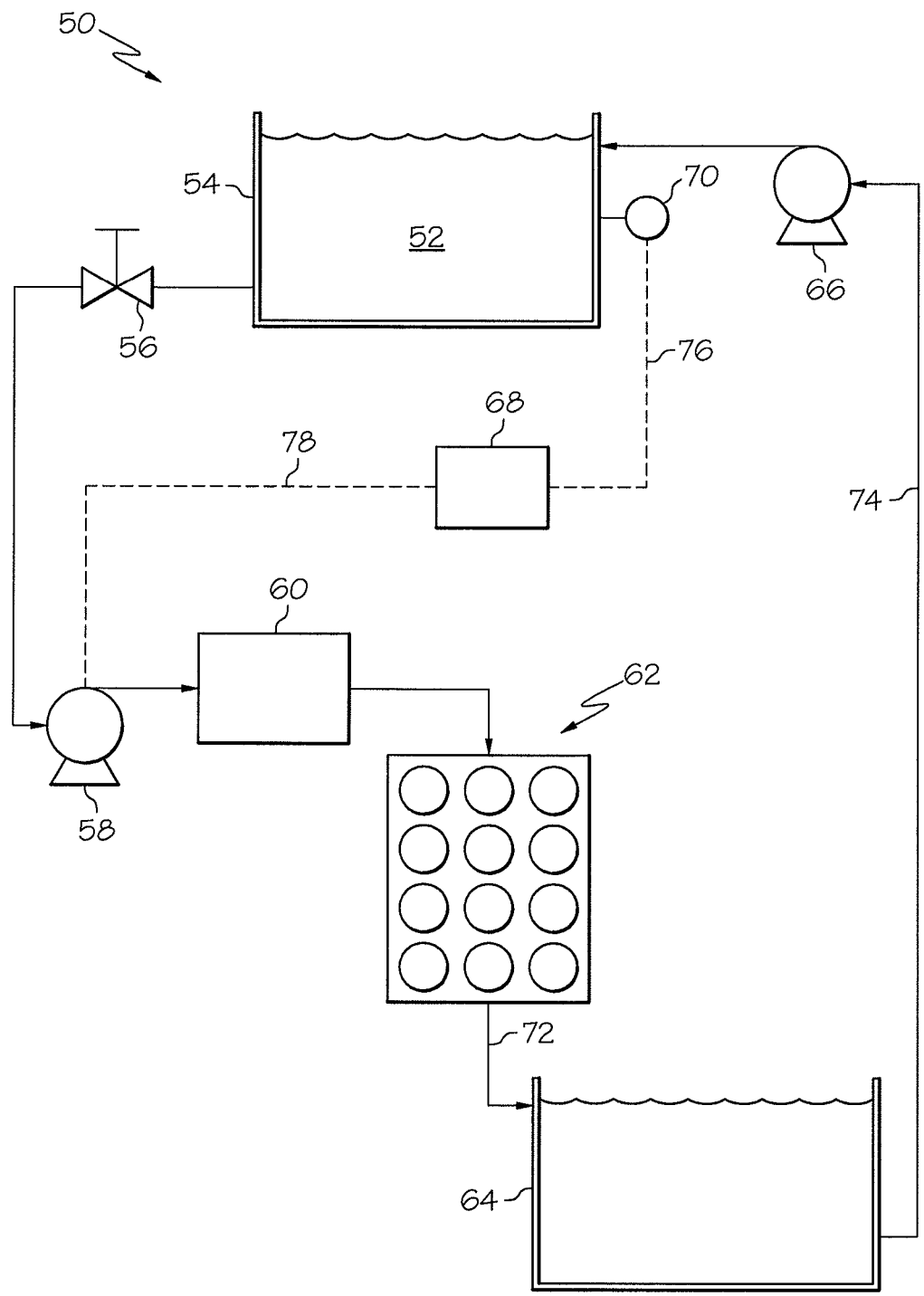
FIG. 2 is process flow diagram illustrating an alternative aspect of the disclosed system for selectively removing ions from acidic solutions.

As shown in FIG. 2, the periodic treatment system, generally designated 50, may include an acidic solution 52, a first tank 54, a valve 56, a first pump 58, a chiller 60, an ion exchanger 62, a second tank 64 and a second pump 66. Optionally, the system 50 may also include a controller 68 and a sensor 70.

The valve 56, the first pump 58, the chiller 60, and the ion exchanger 62 may draw the acidic solution 52 from the first tank 54, cool the acidic solution 52 at the chiller 60, and then selective remove ions from the cooled acidic solution 52 at the ion exchanger 62 in a manner similar to that described above in connection with the continuous treatment system 10. However, rather than directly returning the treated acidic solution 12 to the first tank 54, the treated acidic solution 12 may be passed (by way of fluid line 72) to the second tank 64 for storage.

The second tank 64 may be a holding tank, and may be sized and constructed in a manner similar to the first tank 54. As the acidic solution 52 is drawn from the first tank 54 and ultimately exits the ion exchanger 62, the treated acidic solution 12 is stored in the second tank 64 until it is ready for use. The treated acidic solution 12 may be returned to the first tank 54 by way of the second pump 66 and fluid line 74.

In one aspect, the periodic treatment process may begin by manually actuating the first pump 58 to draw the acidic solution 52 from the first tank 54.

In another aspect, the optional controller 68 may automate the process. Specifically, pursuant to the second aspect, the controller 68 may receive signals from the sensor 70 (by way of communication line 76) that may be indicative of the concentration of certain ions (e.g., copper ions) in the acidic solution 52 in the first tank 54. Then, when the controller 68 determines that the a threshold concentration has been exceeded (e.g., 400 parts per million) the controller 68 may send a signal (by way of communication line 78) to the first pump 58 instructing the first pump to begin drawing the contaminated acidic solution 52 through the system 50.

Accordingly, the system 50 periodically draws acidic solution 52 from the first tank 54, cools the acidic solution 52 prior to passing the acidic solution 52 through the ion exchanger 62 to selectively remove undesirable metal ions, and then stores the treated acidic solution 52 in the second tank 64 until the first tank 54 is ready to receive the treated acidic solution 52.

Figure 3:
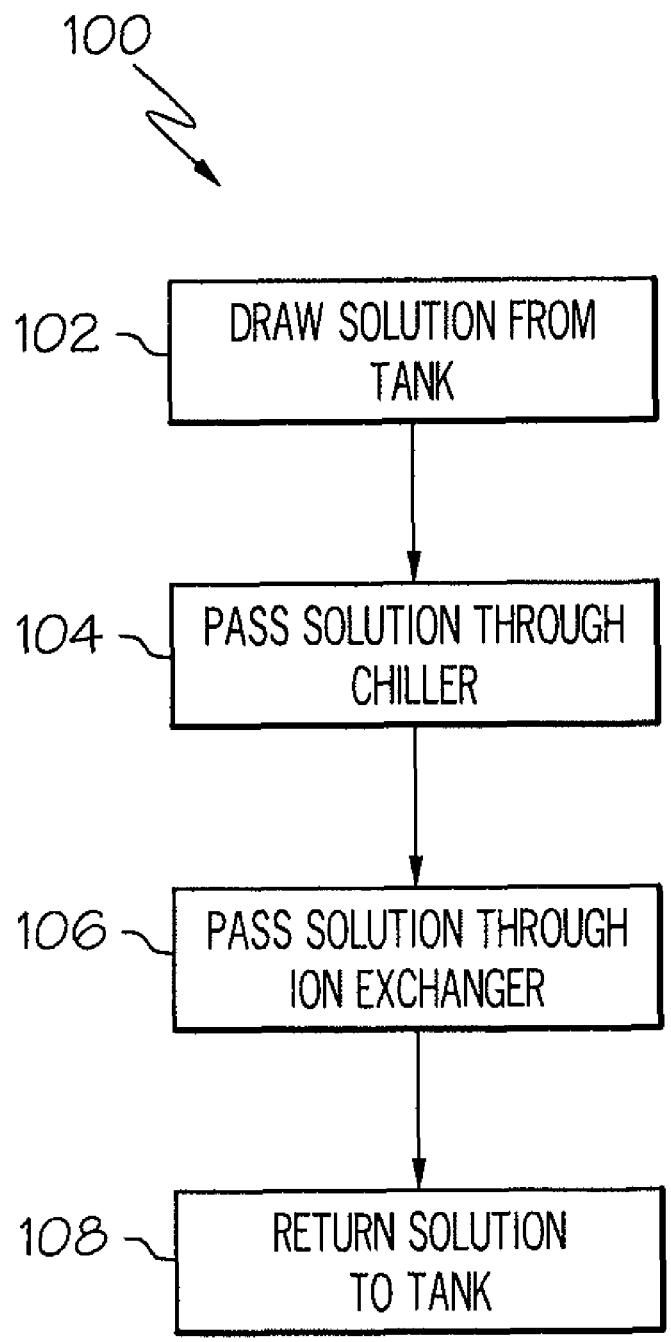
FIG. 3 is a flow chart illustrating one aspect of the disclosed method for selectively removing ions from acidic solutions.

Referring to FIG. 3, one aspect of the disclosed method for selectively removing metal ions from an acidic solution, generally designated 100, may begin with the step of drawing contaminated acidic solution from a tank, as shown in block 102. Then, as shown in block 104, the acidic solution may be passed through a chiller to drop the temperature of the acidic solution prior to treatment. For example, the temperature of the acidic solution may be reduced to below about 42° F. As shown in block 106, the cooled acidic solution may be passed through an ion exchanger to selectively remove undesirable ions. Finally, as shown in block 108, the treated acidic solution may be returned to the tank.

EXAMPLE 1

Comparative

A deoxidizer solution was prepared by blending 42° Baume nitric acid with water to obtain a 27 percent by weight mixture. The volume of the nitric acid mixture was noted and 15.9 grams of TURCO® ALDOX V solution (a commercially available concentrate) was added per liter of the mixture. The deoxidizer solution initially included 14420 parts per million iron and 551.3 parts per million copper.

In a separate vessel, 50 milliliters of DOWEX™ M4195 resin (a commercially available copper selective ion exchange resin) was combined with 50 milliliters of the deoxidizer solution. The deoxidizer solution was at a temperature of about 68° F. The resin was in contact with the deoxidizer solution for 2 minutes, after which the deoxidizer solution was strained to remove the resin.

The resulting treated deoxidizer solution included 11530 parts per million iron (a reduction of 2890 parts per million) and 97.67 parts per million copper (a reduction of 453.63 parts per million). Therefore, the ratio of copper removed to iron removed was about 1:6.4.

EXAMPLE 2

A portion of the untreated deoxidizer solution prepared in Example 1 was cooled to a temperature of about 40° F. In an appropriate vessel, 50 milliliters of DOWEX™ M4195 resin was combined with 50 milliliters of the cooled deoxidizer solution. The resin was in contact with the deoxidizer solution for 2 minutes, after which the deoxidizer solution was strained to remove the resin.

The resulting treated deoxidizer solution included 13600 parts per million iron (a reduction of 820 parts per million) and 127 parts per million copper (a reduction of 424.3 parts per million). Therefore, the ratio of copper removed to iron removed was about 1:1.9.

Examples 1 and 2 illustrate that the preference for copper removal was about 3.3 times as great when the deoxidizer solution was cooled to 40° F. from 68° F.

Accordingly, cooling the temperature of an acidic solution prior to passing the acidic solution through an ion exchanger may improve the selective removal of undesirable ions vis-á-vis desirable ion. In particular, when a copper selective ion exchange resin is used to treat an acidic deoxidizer solution contaminated with copper ions, cooling the deoxidizer solution to a temperature below at least about 50° F. significantly improves the selective removal of copper ions vis-á-vis iron ions.

Although various aspects of the disclosed system and method for selectively removing ions from an acidic solution have been shown and described, modifications may occur to those skilled in the art upon reading the specification. For example, the disclosed system and method may also be used to preferentially remove desired ions, rather than undesired ions. The present application includes such modifications and is limited only by the scope of the claims.

What is claimed is:

1. A method for selectively removing copper from an acidic deoxidizer solution comprising the steps of: cooling said acidic deoxidizer solution comprising copper such that a temperature of said acidic deoxidizer solution is about 40° F. or less; and after said cooling step, contacting said acidic deoxidizer solution with an ion exchange resin, said ion exchange resin being a chelating resin selective for copper wherein said resin includes bis-picolyamine functionality on a styrene-DVB, monoporous matrix.

2. The method of claim 1 wherein said acidic solution includes nitric acid and at least one desirable ion.

3. The method of claim 2 wherein said desirable ion is iron.

4. A method for selectively removing copper from an acidic deoxidizer solution stored in a tank, said method comprising the steps of: measuring a concentration of copper in said acidic deoxidizer solution in said tank; when said concentration exceeds a predetermined threshold value drawing said acidic deoxidizer solution from said tank; cooling said drawn acidic deoxidizer solution such that a temperature of said drawn acidic deoxidizer solution is about 40° F. or less; and contacting said cooled acidic deoxidizer solution with an ion exchange resin, said ion exchange resin being a chelating resin selective for copper wherein said resin includes bis-picolyamine functionality on a styrene-DVB, monoporous matrix.

5. The method of claim 4 wherein said acidic deoxidizer solution includes nitric acid and at least one desirable ion.

6. The method of claim 5 wherein said desirable ion is iron.

7. The method of claim 6 wherein said predetermined threshold value is about 600 parts per million.

8. The method of claim 4 wherein said acidic solution is returned to said tank after said contacting step.

\* \* \* \* \*